US012810895B2

(12) United States Patent
Kunze et al.

(10) Patent No.: US 12,810,895 B2
(45) Date of Patent: Nov. 24, 2026

(54) ULTRA-THIN DATA CARRIER AND METHOD OF READ-OUT

(71) Applicant: Ceramic Data Solutions GmbH, Gmunden (AT)

(72) Inventors: Martin Kunze, Gmunden (AT); Christian Pflaum, Bernried (DE)

(73) Assignee: Ceramic Data Solutions GmbH, Gmunden (AT)

( * ) Notice: Subject to any disclaimer, the term of this patent is extended or adjusted under 35 U.S.C. 154(b) by 683 days.

(21) Appl. No.: 18/264,732

(22) PCT Filed: Feb. 3, 2022

(86) PCT No.: PCT/EP2022/052628
§ 371 (c)(1),
(2) Date: Aug. 8, 2023

(87) PCT Pub. No.: WO2022/171522
PCT Pub. Date: Aug. 18, 2022

(65) Prior Publication Data

US 2024/0055021 A1 Feb. 15, 2024

(30) Foreign Application Priority Data

Feb. 12, 2021 (EP) ..................................... 21156858
Nov. 26, 2021 (EP) ..................................... 21210819

(51) Int. Cl.
*G11B 7/24047* (2013.01)
*G11B 7/0045* (2006.01)
*G11B 7/26* (2006.01)

(52) U.S. Cl.
CPC ...... *G11B 7/24047* (2013.01); *G11B 7/00451* (2013.01); *G11B 7/26* (2013.01)

(58) Field of Classification Search
CPC ........................ G11B 7/24047; G11B 7/00451
USPC .......................................................... 235/494
See application file for complete search history.

(56) References Cited

U.S. PATENT DOCUMENTS 4,069,487 A 1/1978 Kasai et al.
4,214,249 A 7/1980 Kasai et al.
4,394,661 A 7/1983 Peeters
4,397,923 A 8/1983 Yasuda et al.
4,556,893 A 12/1985 Rinehart et al.
4,797,316 A 1/1989 Hecq et al.
4,999,278 A 3/1991 Bouldin
5,059,473 A 10/1991 Takahashi et al.
5,063,556 A 11/1991 Chikuma
5,761,111 A 6/1998 Glezer
(Continued)

FOREIGN PATENT DOCUMENTS

CN 101350213 A 1/2009
CN 110653494 1/2020
(Continued)

OTHER PUBLICATIONS

Notification of Reason(s) for Refusal regarding corresponding JP Application No. 2023-548749, mailed Nov. 11, 2025.
(Continued)

*Primary Examiner* — Allyson N Trail
(74) *Attorney, Agent, or Firm* — Lewis & Reese, PLLC

(57) ABSTRACT

The present invention relates to an ultra-thin data carrier for long-term data conservation and to a method of reading out such a data carrier.

21 Claims, 4 Drawing Sheets

(56) References Cited

U.S. PATENT DOCUMENTS

| | | | |
|---|---|---|---|
| 6,039,898 A | 3/2000 | Glushko | |
| 6,120,907 A | 9/2000 | Tahon et al. | |
| 6,133,986 A | 10/2000 | Johnson | |
| 6,143,468 A | 11/2000 | Ohno et al. | |
| 6,171,730 B1 | 1/2001 | Kuroda et al. | |
| 6,214,250 B1 | 4/2001 | Moh et al. | |
| 6,340,543 B1 | 1/2002 | Nagamura et al. | |
| 6,543,691 B1 | 4/2003 | Lemelson et al. | |
| 7,666,579 B1 | 2/2010 | Neogi et al. | |
| 8,462,605 B2 | 6/2013 | Ferren et al. | |
| 10,181,336 B1 | 1/2019 | Georgiou et al. | |
| 10,315,276 B2 | 6/2019 | Wagner et al. | |
| 10,719,239 B2 | 7/2020 | Rowstron et al. | |
| 11,383,321 B2 * | 7/2022 | Rogg | C04B 37/021 |
| 2002/0028015 A1 | 3/2002 | Tack-Don et al. | |
| 2002/0079297 A1 | 6/2002 | Harrison | |
| 2002/0164069 A1 | 11/2002 | Nagano et al. | |
| 2003/0186624 A1 | 10/2003 | Koike et al. | |
| 2003/0189228 A1 | 10/2003 | Ieong et al. | |
| 2005/0009235 A1 * | 1/2005 | Swenson | B23K 26/0622 438/462 |
| 2005/0181089 A1 | 8/2005 | Ogawa et al. | |
| 2005/0208392 A1 | 9/2005 | Yamamoto | |
| 2006/0044385 A1 | 3/2006 | Wurm et al. | |
| 2006/0119743 A1 | 6/2006 | Lin | |
| 2006/0120262 A1 | 6/2006 | Kiyono | |
| 2006/0147841 A1 | 7/2006 | Ohmi et al. | |
| 2006/0196945 A1 | 9/2006 | Mendels | |
| 2008/0238611 A1 | 10/2008 | Costa et al. | |
| 2008/0320205 A1 | 12/2008 | Lunt et al. | |
| 2009/0207395 A1 | 8/2009 | Kasono | |
| 2009/0245077 A1 | 10/2009 | Ueda et al. | |
| 2010/0040960 A1 | 2/2010 | Piao et al. | |
| 2010/0068444 A1 | 3/2010 | Asplund et al. | |
| 2010/0135147 A1 | 6/2010 | Bard et al. | |
| 2010/0151391 A1 | 6/2010 | Neogi et al. | |
| 2010/0289186 A1 | 11/2010 | Longo et al. | |
| 2011/0318695 A1 | 12/2011 | Hwang et al. | |
| 2013/0273259 A1 | 10/2013 | Depardieu et al. | |
| 2014/0209928 A1 * | 7/2014 | Teng | H10W 90/00 257/82 |
| 2015/0077535 A1 | 3/2015 | Izatt et al. | |
| 2015/0302926 A1 | 10/2015 | Shiozawa et al. | |
| 2015/0324677 A1 | 11/2015 | Talyansky et al. | |
| 2015/0382476 A1 | 12/2015 | Zenou et al. | |
| 2016/0118077 A1 | 4/2016 | Lunt et al. | |
| 2016/0199935 A1 | 7/2016 | Chen et al. | |
| 2018/0039806 A1 | 2/2018 | Harrison | |
| 2018/0130531 A1 | 5/2018 | Ahner et al. | |
| 2018/0246415 A1 | 8/2018 | Xalter et al. | |
| 2019/0273025 A1 | 9/2019 | Chen et al. | |
| 2019/0324240 A1 | 10/2019 | Shroff et al. | |
| 2019/0353912 A1 | 11/2019 | Chen et al. | |
| 2020/0075383 A1 | 3/2020 | Minemura | |
| 2020/0142171 A1 | 5/2020 | Xiong et al. | |
| 2021/0370704 A1 * | 12/2021 | Schmidt | B42D 25/23 |
| 2022/0089478 A1 * | 3/2022 | Krüger | C03C 15/00 |
| 2022/0106218 A1 * | 4/2022 | Cao | C03C 15/00 |
| 2022/0223806 A1 * | 7/2022 | Ostholt | H10K 71/851 |
| 2022/0291712 A1 * | 9/2022 | Baby | C03C 21/002 |
| 2022/0313108 A1 * | 10/2022 | Erhardt | A61B 5/062 |
| 2023/0177298 A1 * | 6/2023 | Pflaum | G06K 19/06037 235/375 |
| 2025/0021781 A1 * | 1/2025 | Pflaum | G11B 7/24047 |
| 2025/0070528 A1 * | 2/2025 | Ortner | H01S 5/02218 |

FOREIGN PATENT DOCUMENTS

| | | |
|---|---|---|
| DE | 19724214 | 12/1998 |
| DE | 102014118497 | 6/2017 |
| EP | 0197256 A2 | 10/1986 |
| EP | 2157533 | 2/2010 |
| EP | 3109058 | 10/2018 |
| EP | 3955248 | 2/2022 |
| EP | 4044182 | 8/2022 |
| JP | H02-215587 | 8/1990 |
| JP | H02-277689 | 11/1990 |
| JP | H08-221808 A | 8/1996 |
| JP | 2002-351055 | 3/2002 |
| JP | 2003-137677 | 5/2003 |
| JP | 2004-062981 | 2/2004 |
| JP | 2007-018649 A | 1/2007 |
| JP | 3913319 | 5/2007 |
| JP | 2007-319921 | 12/2007 |
| JP | 2010-184862 A | 8/2010 |
| JP | 2013-020660 A | 1/2013 |
| JP | 6689067 | 4/2020 |
| KR | 20010112497 | 12/2001 |
| WO | 1985/001380 A1 | 3/1985 |
| WO | 91/13440 | 9/1991 |
| WO | 99/45441 | 9/1999 |
| WO | 2000/073983 | 12/2000 |
| WO | 2021/028035 | 2/2021 |
| WO | 2022/002418 | 1/2022 |
| WO | 2022/002444 | 1/2022 |
| WO | 2022/033701 | 2/2022 |
| WO | 2022/033800 | 2/2022 |
| WO | 2022/194354 | 9/2022 |

OTHER PUBLICATIONS

Watanabe M., et al., "Three-Dimensional Optical Data Storage in Vitreous Silica," Japanese Journal of Applied Physics, JP, vol. 37, No. 12 B, part 02, Dec 15, 1998.

Glezer, E. N., et al., "Three-Dimensional Optical Storage Inside Transparent Materials," Optics Letters, vol. 21, No. 24, Dec 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec 17, 2020 from website ://glassproperties.com/glasses.

A. Laskin et al., "Beam-shaping unit for micromachining," Proceedings of SPIE—The Int'l Soc for Optical Eng'g (Sep. 2013).

Haight, Richard, et al., "High Resolution Material Ablation and Deposition with Femtosecond Lasers and Applications to Photomask Repair," Journal of Modern Optics, Nov. 10, 15 Dec 2004, vol. 51, No. 16-18, pp. 2781-2796.

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

International Search Report and Written Opinion regarding corresponding PCT Application No. PCT/EP2022/052628, mailed Jun. 2, 2022.

Extended European Search Report regarding corresponding European Patent Application No. 21156858.9, mailed Aug. 6, 2021.

Communication Pursuant to Article 94(3) EPC regarding corresponding European Patent Application No. 21156858.9, mailed Mar. 10, 2022.

Communication Pursuant to Article 94(3) EPC regarding corresponding European Patent Application No. 21156858.9, mailed Sep. 1, 2022.

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

(56) References Cited

OTHER PUBLICATIONS

Extended European Search Report regarding corresponding European Patent Application No. 24187596.2, mailed Dec. 10, 2024.
Brief Communication regarding Oral Proceedings on Jan. 11, 2024 by videoconference regarding corresponding EP Application No. 22707349.1, mailed Jan. 9, 2024.
First Office Action regarding corresponding Chinese Patent Application No. 202280014757.9, mailed Apr. 10, 2026.

* cited by examiner

Fig. 1
Fig. 2

Fig. 3
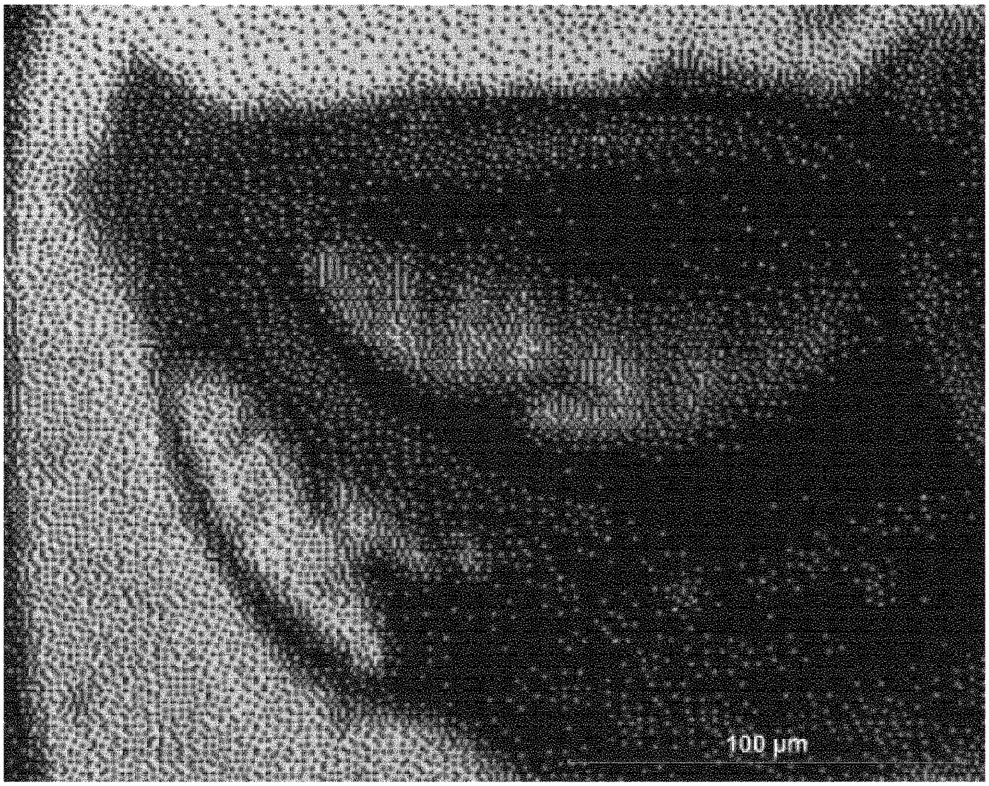
Fig. 4

ULTRA-THIN DATA CARRIER AND METHOD OF READ-OUT

INTRODUCTION

The present invention relates to an ultra-thin data carrier and to a method of manufacturing such an ultra-thin data carrier.

It is estimated that, on average, humans generate about 2.5 quintillion bytes per day. While a large portion of said data may be generated for short-term use only, the demand for long-term data storage is increasing on a day by day basis. Apparently, state of the art data carriers such as flash, hard disc drives (HDD) and magnetic tape are far from ideal in terms of long-term storage. Thus, companies like Microsoft are currently exploring alternative techniques for alternative storage technologies (see, for example, the so-called "Project Silica" and U.S. Pat. No. 10,719,239).

A different technique for long-term storage of information has been described in WO 2021/028035. Said technique is based on the use of a ceramic substrate coated with a layer of a different material and encoding information on said coated substrate by using, e.g., a laser in order to manipulate localized areas of said coated substrate. This technique has proven to allow for information storage which is highly resistant to moisture, electromagnetic fields, acidic and corrosive substances, etc. such that the encoded writable ceramic plate provides a durability which is unavailable from other commonly used information storage mediums. One potential disadvantage of said technique, though, is the use of rather voluminous ceramic plates having a thickness of about 1 mm. Accordingly, the data storage density per volume may not achieve data storage densities of currently used data carriers.

Accordingly, there is a need for further improvement of data carriers suitable for long-term use and storage.

The inventors of the present invention have now, surprisingly, realized that the techniques described in WO 2021/028035 may be analogously employed on thin films of glass ceramic, ceramic or glass material.

SUMMARY

Accordingly, the present invention, according to a first aspect, relates to a data carrier comprising a ceramic (glass ceramic or glass) substrate having first and second opposite surfaces and a thickness of at most 500 μm, preferably of at most 200 μm, more preferably of at most 150 μm, wherein the first surface of the substrate comprises a plurality of laser-ablated recesses encoding information, wherein each recess preferably has a depth of at most 1 μm. While said ceramic films, due to their thickness, may be mechanically less stable as they may, e.g., break during excessive kinking, their resistance to moisture, electromagnetic fields and acidic or corrosive substances is as high as that of the ceramic substrates described in WO 2021/028035. At the same time, reducing the thickness of the data carrier by at least a factor of 2 (preferably 5, more preferably 6) automatically increases the data storage density per volume by the same factor.

The information encoded by means of the plurality of recesses may be analog and/or digital information. For example, the plurality of recesses may, in conjunction, form an analogue image, text, numbers or the like. Alternatively, the plurality of recesses may encode digital information similar to, for example, digital information encoded on a CD, DVD Blu-ray Disc or a data matrix code. In any case, the encoded information can preferably be decoded optically, either visually by the naked eye or with the help of suitable optics such as a microscope or the like or by means of an optical decoder.

Different from the information storage medium according to WO 2021/028035, the data carrier according to the first aspect of the present invention does not require an additional coating. Since the ceramic films used for the data carrier of the present invention are sufficiently flexible to be wound up on a roll, it may, under certain premises, be challenging to coat said ceramic film and to maintain said coating after data encoding and bending of the substrate. Accordingly, it is the substrate of the data carrier according to the first aspect that comprises the plurality of recesses encoding the information. These recesses are generated by means of a laser beam and may have various shapes and/or depths as described in great detail in WO 2022/002418, which document is fully incorporated herein by reference, in particular with regard to any disclosure therein explaining in detail how to encode information by means of recess depth. In its most simple form of this first aspect, each recess has about the same depth and the optical decoder detects the difference between a substrate area without recess and a recess by measuring, for example, a phase difference or detecting changes in the reflectivity (if, for example, the substrate surface is polished and the bottom of the recess is curved or roughened). In order to minimally distort the thin ceramic film material it is preferred that the recesses have a depth as small as possible, for example a depth of at most 100 nm, preferably of at most 50 nm and even more preferably of at most 30 nm. It is also preferred that the depth of each recess is smaller than 1%, preferably smaller than 0.1%, more preferably smaller than 0.05% of the thickness of the substrate.

In order to create well-defined recesses which may be easily detected it preferred that the recesses are generated by means of laser ablation utilizing a picosecond or a femtosecond pulse laser. Indeed, using such pulse lasers leads to cylindrical recesses without any molten material edges at the top circumference of each recess.

In order to further increase the data storage density it is preferred that the second surface of the substrate also comprises a plurality of laser-ablated recesses encoding information, each recess having a depth of at most 1 μm and properties similar to those discussed above. Since the thickness of the substrate is at least two orders of magnitude greater than the depth of each recess one may distinguish, using well known techniques, whether light has been reflected on the first surface, at the bottom of a recess of the first surface or at the opposing second surface.

According to a second aspect, the present invention relates to a data carrier comprising a ceramic substrate having first and second opposite surfaces and a thickness of at most 500 μm, preferably of at most 200 μm, more preferably of at most 150 μm, wherein the first surface of the substrate is coated with a first coating, the material of the first coating being different from the material of the ceramic substrate, wherein the first coating comprises a plurality of laser-ablated recesses encoding information. In comparison to the first aspect of the present invention discussed above, the additional coating provides the benefit of allowing for more complex optical effects, which are outlined in detail in WO 2021/028035, the entire contend of which is hereby incorporated by reference. For example, the material of the first coating may have different optical properties compared to the optical properties of the ceramic substrate. For example, if the material of the ceramic substrate exhibits a bright or white color, whereas the material of the first coating exhibits a dark or black color, ablating the material of the first coating so as to create recesses which extend all the way towards or even into the ceramic substrate will create a strong optical contrast between the overall surface of the first coating on the one hand and each of the recesses on the other hand. This contrast may be visible (e.g., for the naked eye) generating the impression of an image, text or the like or may provide a digital encoding (recess versus no recess) which may be easily and reliably decoded by an optical decoder.

However, in view of the envisaged long-term use of the data carrier of the present invention, one has to ascertain that the first coating remains reliably attached to the ceramic substrate, preferably even if the substrate is bent or wound up on a roll. Therefore, it is preferable to apply a rather thin coating layer having a thickness of at most 10 μm, preferably at most 1 μm, more preferably at most 200 nm, even more preferably at most 150 nm, even more preferably at most 100 nm, even more preferably at most 50 nm, even more preferably at most 30 nm and most preferably at most 20 nm. In terms of the optical effect to be achieved, e.g., by means of an optical contrast, it is sufficient to provide for a thickness which allows for substantial absorption, multiscattering, reflection, or the like.

In view of ease of the coating process and, in particular, the decoding process it is preferred that the average roughness Ra of both the substrate surface and the coating surface is smaller than 10 nm, preferably smaller than 5 nm, more preferably smaller than 3 nm. Ra is the arithmetic average value of a filtered roughness profile determined from deviations about the center line along the evaluation length.

Since the first coating on the ceramic substrate may create strain in the data carrier, it may be beneficial to coat both surfaces of the ceramic substrate in order to achieve a symmetric strain. It is therefore preferred that the second surface of the substrate is coated with a second coating, the material of the second coating being different from the material of the ceramic substrate (and preferably identical to the material of the first coating). Of course, if a second coating is provided, said second coating may also be used to encode additional information, thus doubling the amount of data to be stored on the data carrier. Accordingly, it is preferred that the second coating also comprises a plurality of laser-ablated recesses encoding information.

In order to ensure a strong bond between the first and second coating and the ceramic substrate, the data carrier may be tempered during and/or after the coating process. Such tempering may achieve a sintered interface between the substrate and the first coating and/or between the substrate and the second coating, which sintered interface enhances the bond between substrate and coating(s). Preferably, the sintered interface comprises at least one element from the substrate and at least one element from the respective coating.

As mentioned above, the data carrier according to the second aspect allows for providing an optical contrast or another difference in an optical property between areas of unperturbed coating and areas with a recess. For this purpose, it is preferred that each recess in the first and/or second coating has a depth which is equal to or greater than the thickness of the respective coating. In other words, it is preferred that the coating material is substantially completely ablated (or evaporated or otherwise removed) at each recess in order to make the material of the ceramic substrate accessible for optical decoding (by, e.g., the naked eye, a microscope, a camera or a more sophisticated optical decoder). In this context, it would be ideal to exactly remove all coating material at a recess position without affecting the ceramic substrate. Yet, this may be difficult to reliably and reproducibly control. Accordingly, it may be preferable to control the laser system used for ablation such that each recess in a first and/or second coating has a depth which is slightly greater than the thickness of the respective coating. For example, the ratio between the depth of each recess and the thickness of the respective coating may be in a range between 1.01 and 1.2, preferably between 1.01 and 1.1, more preferably between 1.02 and 1.05. Preferably, each recess extends into the ceramic substrate with a depth of at most 1 μm, preferably of at most 100 nm, more preferably of at most 50 nm, even more preferably of at most 30 nm, even more preferably of at most 20 nm and most preferably of at most 10 nm.

It may also be preferable that each recess in the first and/or second coating has a depth which is smaller than the thickness of the respective coating. For example, the depth of each recess may be optimized such that the recess never touches the ceramic substrate, while at the same time the bottom material below the recess of the respective coating is sufficiently thin that laser light of a specific wavelength may still, at least partly, transmit through said coating material and reach the material of the ceramic substrate in order to achieve the optical contrast discussed above. For this purpose, it is preferred that the ratio between the depth of each recess and the thickness of the respective coating is in a range between 0.9 and 0.99, preferably between 0.95 and 0.99, more preferably in a range between 0.97 and 0.99. Alternatively, each recess in the first and/or second coating may have a depth which is substantially smaller than the thickness of the respective coating. In this case, the recesses may be utilized in a way similar to the first aspect of the present invention discussed above. In other words, the ceramic substrate in this case merely serves as a carrier substrate with the encoding and decoding taking place entirely with respect to the coating material only.

Preferably, the first and/or second coating comprises one or a combination of the following materials: Cr, Co, Ni, Fe, Al, Ti, Si, W, Zr, Ta, Th, Nb, Mn, Mg, Hf, Mo, V; a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; or a metal silicide such as $TiSi_2$, $ZrSi_2$, $MoSi_2$, MoSi, $WSi_2$, PtSi, $Mg_2Si$.

Of course, all features discussed above with regard to the first aspect, which may also be employed in the context of the second aspect, should be considered to be disclosed for the second aspect as well. Moreover, all features discussed further below apply equally to both aspects of the present invention.

Preferably, the ceramic substrate comprises one or a combination of the following materials: silicon oxide, aluminum oxide, boron oxide, sodium oxide, potassium oxide, lithium oxide, zinc oxide, magnesium oxide.

Preferably, the substrate is transparent for at least one wavelength range within the visible spectrum, preferably over the entire visible spectrum, i.e., between 400 nm and 700 nm and/or with the UV spectrum, preferably over the entire UV spectrum, i.e., between 100 nm and 400 nm. Preferably, the substrate exhibits a transmittance of at least 80%, preferably at least 90% and more preferably at least 95% for at least one wavelength range within the visible spectrum, preferably over the entire visible spectrum, i.e., between 400 nm and 700 nm and/or within the UV spectrum, preferably over the entire UV spectrum, i.e., between 100 nm and 400 nm.

The data carriers of the present invention may be provided in thin sheets, which may be stacked on top of each other. For example, each data carrier may be a circular, disc-like, rectangular, or quadratic sheet, for example a sheet of 10 cm×10 cm. Such sheets may be easily handled during encoding and decoding and may be stacked on top of each other with, e.g., 50 or even 500 sheets forming one stack.

Alternatively, the data carrier may be an elongated film, which may be wound up in a roll. For this purpose, it is particularly advantageous if the substrate (and preferably the entire data carrier) has a Young's modulus of at most 80 GPa, preferably of at most 75 GPa. It is further preferred that the data carrier does not break at a radius of curvature of 100 mm, preferably 50 mm and more preferably 25 mm, and more preferably 10 mm, and more preferably 5 mm. and more preferably 2.5 mm. In order to achieve these mechanical properties it is preferred to make the data carrier as thin as possible. Preferably, the thickness of the data carrier is at most 130 μm, more preferably at most 110 μm, even more preferably at most 100 μm, even more preferably at most 90 μm and most preferably at most 80 μm.

As discussed above, the recesses may have an arbitrary shape and may be elliptical, round, rectangular, square or the like. Different recesses of different shapes may be utilized to also encode information. However, in its most simple and straightforward approach, a plurality of essentially identical, substantially round recesses are generated by means of a laser beam, preferably using picosecond or femtosecond laser pulses. These recesses may be arranged in a regular pattern such as a rectangular, a square or a hexagonal pattern in order to encode digital information. Preferably, the diameter of said recesses is as small as possible, yet still sufficiently large that a proper decoding is possible. Preferably, each recess has a maximum extension perpendicular to its depth of at most 1 μm, preferably of at most 500 nm, more preferably of at most 300 nm, even more preferably of at most 200 nm and most preferably of at most 150 nm.

Preferably, the data carrier comprises at least 10 Megabytes of encoded information per $cm^2$ (per substrate surface), more preferably at least 100 Megabytes of encoded information per $cm^2$ and even more preferably at least 1 Gigabyte of information per $cm^2$.

The present invention further relates to a method of manufacturing a data carrier as described above. For manufacturing the data carrier according to the first aspect, a ceramic substrate is provided and a plurality of recesses in either or both surfaces of the substrate are generated by means of laser ablation, preferably using picosecond or femtosecond laser pulses. For manufacturing a data carrier according to the second aspect, a ceramic substrate is provided, either or both surfaces of the substrate are coated with first and/or second coatings, and a plurality of recesses are generated in the first and/or second coatings by means of laser ablation, preferably using picosecond or femtosecond laser pulses.

Laser ablation may be achieved by using, e.g., a pulsed laser, preferably a femtosecond laser. In order to achieve preferably cylindrical recesses, it is preferred to use a laser beam having a Gaussian or Bessel shape.

Coating either or both surfaces of the substrate with first and/or second coatings may be performed by various known techniques. Particularly preferred techniques are physical vapor deposition or chemical vapor deposition.

As mentioned above, tempering may enhance the bond between substrate and coating. Thus, the method preferably comprises tempering the coated substrate at a temperature of at least 200° C., preferably at least 500° C. and more preferably at least 1,000° C.

Alternatively, the ceramic substrate may be treated on either or both surfaces of the substrate with one or more of the following techniques: heating, sputtering, HiPIMS (High Power Impulse Magnetron Sputtering), applying forming gas such as nitrogen and/or hydrogen. These techniques may improve the surface quality of the substrate and/or may lead to a stronger bond between the substrate and the coating(s).

The ceramic substrate is preferably transparent to the wavelength of the laser light used for laser ablation and laser ablation is preferably performed with laser light transmitted through the ceramic substrate. Thus, any debris generated during ablation cannot affect the optics used for ablation because the data carrier forms a barrier between the ablated material and the optics.

The present invention further relates to a method of reading out a data carrier as described above. According to the method, the data carrier of the first or second aspect is illuminated with light of a first wavelength. Light transmitted through the data carrier and/or reflected by the data carrier is detected and analyzing in order to decode the information encoded in the recesses of the data carrier. For example, light passing through the recesses (in the substrate in case of the first aspect or in the coating in case of the second aspect) and light being blocked at the data carrier wherever no recess is present (by, e.g., the intrasnparent substrate or the intransparent coating) may in combination generate a pattern (bright/dark) such as a QR code which may then be decoded using well-known techniques.

Preferably, the data carrier comprises a ceramic substrate and a coating with laser-ablated recesses on one surface of the ceramic substrate, wherein the ceramic substrate is transparent to the first wavelength and wherein light transmitted through the ceramic substrate is detected. This may happen both in transmission and reflection mode. In particular, the data carrier may preferably be illuminated through the ceramic substrate from the side opposite to the coating. Moreover, light originating from the recesses may also be detected through the ceramic substrate from the side opposite to the coating. This technique improves the signal-to-noise ratio because the side opposite to the coating with the recesses is typically cleaner and/or has a smoother surface facilitating imaging. With dust particles possibly being present on the side comprising the recesses it is particularly advantageous to illuminate from and detect on the opposite side with the illumination and/or detection focus being located at the bottom of the recesses in order to achieve a minimum effect from the dust (or other impurities) onto the optical beam.

BRIEF DESCRIPTION OF THE DRAWINGS

An example of the present invention is subsequently described with reference to the Figures, which show:

FIG. 1 a transmission microscopy image of an exemplary data carrier at a magnification of 5×;

FIG. 2 a transmission microscopy image of the data carrier of FIG. 1 at a magnification of 10×;

FIG. 3 a transmission microscopy image of the data carrier of FIG. 1 at a magnification of 20×;

FIG. 4 a transmission microscopy image of the data carrier of FIG. 1 at a magnification of 50×;

DETAILED DESCRIPTION

For the examples, a ceramic substrate having a size of 10 mm×10 mm and consisting of 100 μm thick sapphire substrate ($Al_2O_3$) was coated with a coating of CrN having a thickness of 100 nm by means of physical vapor deposition (PVD). Circular recesses having a diameter of about 1 μm (Example 1) and approximately 500 nm (Examples 2 and 3) were ablated from the coating using a 200 femtosecond laser at a wavelength of 515 nm.

The resulting data carrier of Example 1 was imaged with an Olympus BX-51 at various magnifications. The respective transmission microscopy images at magnifications of 5×, 10×, 20×, 50× and 100× are shown in FIGS. 1-5, respectively.

Figure 5:
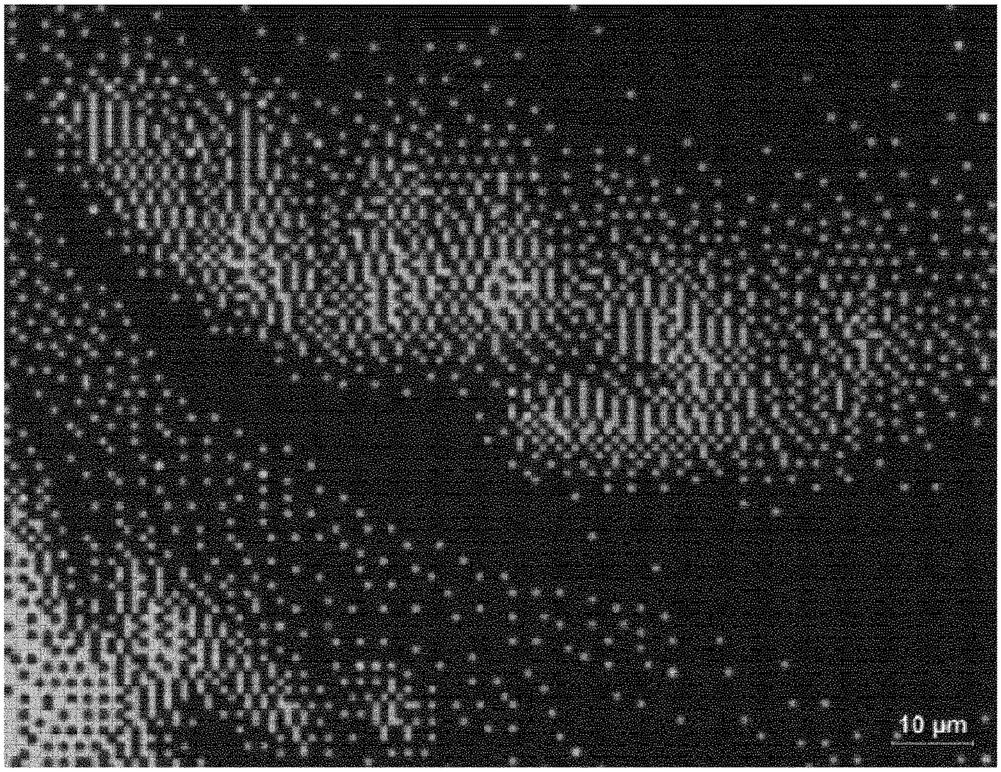
FIG. 5 a transmission microscopy image of the data carrier of FIG. 1 at a magnification of 100×.
Figure 6:
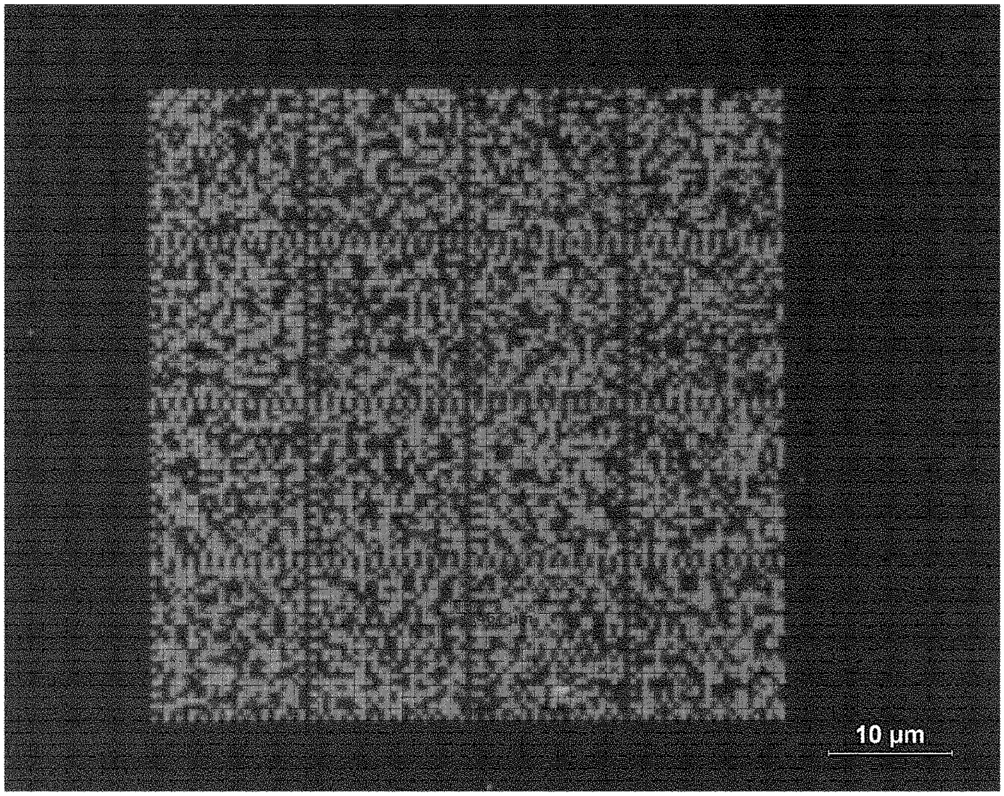
FIG. 6 a transmission microscopy image of another exemplary data carrier inscribed with information encoded digitally.
Figure 7:
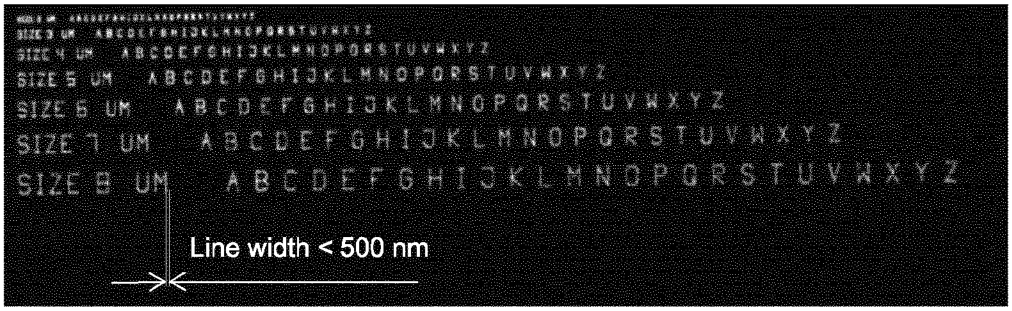
FIG. 7 a transmission microscopy image of another exemplary data carrier inscribed with alphabetic characters in single-line font of 2-8 μm height.

As is evident from these Figures, it is possible to reliably and irreversibly create recesses in the coating so as to achieve a superb optical contrast between the material of the ceramic substrate (which is transparent) and the material of the coating layer (which is light absorbing). While the recesses of this Example 1 encode analog information, namely the photograph of the zebra, it is similarly possible to use the various recesses to encode digital information (recess present versus recess not present) as depicted in FIG. 6 (Example 2) or alphanumeric characters as displayed in FIG. 7 (Example 3). In Example 2, individual "pixels" are smaller than 500 nm in width. In Example 3, the line width of the characters is approximately 500 nm.

The coating and ablation techniques illustrated above with reference to the examples may be analogously employed with a ceramic substrate having a thickness of at most 200 μm. For example, the same coating may be applied onto the so-called glass-ribbon (reference number 2010-03E) available from Nippon Electric Glass. Said glass-ribbon is available in thicknesses between 4 μm and 50 μm and lengths of up to 100 m. Similarly, Alumina Ribbon Ceramic or Ribbon ceramic made from zirconia (both with a thickness as low as 20 μm), available from Corning, may be employed. Other suitable and particularly preferred materials are: AGC Spool, AGC Dragontrail, Corning® Willow® Glass, Corning Standard Glass Carriers SGC 3.4, SGC 7.8 and SGC 9.0, Nippon Electric Glass—G-Leaf (Ultra-thin Glass), SCHOTT AS 87 eco, SCHOTT AF 32 Eco, and SCHOTT Xensation® Flex.

The invention claimed is:

1. A data carrier comprising a ceramic substrate having first and second opposite surfaces and a thickness of at most 500 μm, wherein the first surface of the ceramic substrate comprises a plurality of laser-ablated recesses encoding information, each recess having a depth of at most 1 μm, wherein the second surface of the ceramic substrate comprises a plurality of laser-ablated recesses encoding information, each recess having a depth of at most 1 μm.

2. The data carrier of claim 1, wherein the thickness of the data carrier is at most 200 μm.

3. The data carrier of claim 1, wherein each recess has a depth of at most 100 nm and/or wherein the depth of each recess is smaller than 1% of the thickness of the ceramic substrate.

4. The data carrier of claim 1, wherein the ceramic substrate comprises one or a combination of the following materials: silicon oxide, aluminum oxide, boron oxide, sodium oxide, potassium oxide, lithium oxide, zinc oxide, magnesium oxide.

5. The data carrier of claim 1, wherein the data carrier is wound up in a roll.

6. A data carrier comprising a ceramic substrate having first and second opposite surfaces and a thickness of at most 500 μm, wherein the first surface of the ceramic substrate is coated with a first coating, the material of the first coating being different from the material of the ceramic substrate, wherein the first coating comprises a plurality of laser-ablated recesses encoding information, wherein the second surface of the ceramic substrate is coated with a second coating, the material of the second coating being different from the material of the ceramic substrate, wherein the second coating comprises a plurality of laser-ablated recesses encoding information.

7. The data carrier of claim 6, wherein the thickness of the ceramic substrate is at most 200 μm.

8. The data carrier of claim 6, wherein the thickness of the first coating is at most 10 μm.

9. The data carrier of claim 6, wherein each recess in the first coating has a depth of at most 1 μm.

10. The data carrier of claim 6, wherein each recess in the first coating has a depth which is smaller than the thickness of the respective coating.

11. The data carrier of claim 6, wherein each recess extends into the ceramic substrate with a depth of at most 1 μm.

12. The data carrier of claim 6, wherein a sintered interface is present between the ceramic substrate and the first coating.

13. The data carrier of claim 6, wherein the first coating comprises one or a combination of the following materials: a metal; a metal nitride; a metal carbide; a metal oxide; a metal boride; or a metal silicide.

14. A method of manufacturing a data carrier comprising a ceramic substrate having first and second opposite surfaces and a thickness of at most 500 μm, the method comprising:

providing the ceramic substrate;

during a coating process, coating either or both surfaces of the ceramic substrate with first and/or second coatings, the material of the first and/or second coatings being different from the material of the ceramic substrate; and generating a plurality of recesses in the first and/or second coatings by laser ablation to encode information, wherein the ceramic substrate is transparent to the wavelength of a laser light used for the laser ablation, wherein laser ablation is performed with the laser light transmitted through the ceramic substrate.

15. The method of claim 14, further comprising tempering the data carrier during and/or after the coating process.

16. The method of claim 14, wherein the ceramic substrate is treated on either or both of the first and second surfaces of the ceramic substrate with one or more of the following techniques: heating, sputtering, HiPIMS, or applying a nitrogen and/or hydrogen forming gas.

17. A method of reading out information encoded in a data carrier, wherein the data carrier comprises a ceramic substrate having first and second opposite surfaces and a thickness of at most 500 μm, wherein the first surface of the ceramic substrate is coated with a first coating, the material of the first coating being different from the material of the ceramic substrate, wherein the first coating comprises a plurality of laser-ablated recesses encoding information, the method comprising:

illuminating the data carrier with light of a first wavelength;

detecting light transmitted through the data carrier and/or reflected by the data carrier; and analyzing the detected light to decode the information encoded in the recesses of the first coating, wherein the ceramic substrate is transparent to the first wavelength, and wherein light transmitted through the ceramic substrate is detected.

18. The method of claim 17, wherein the data carrier is illuminated from the second surface.

19. The method of claim 17, wherein light reflected by the data carrier is detected, wherein light reflected by the data carrier is detected from the second surface.

20. A data carrier comprising a ceramic substrate having first and second opposite surfaces and a thickness of at most 500 μm, wherein the first surface of the ceramic substrate comprises a plurality of laser-ablated recesses encoding information, each recess having a depth of at most 1 μm, wherein the data carrier is wound up in a roll.

21. A method of reading out information encoded in a data carrier, wherein the data carrier comprises a ceramic substrate having first and second opposite surfaces and a thickness of at most 500 μm, wherein the first surface of the ceramic substrate is coated with a first coating, the material of the first coating being different from the material of the ceramic substrate, wherein the first coating comprises a plurality of laser-ablated recesses encoding information, the method comprising:

illuminating the data carrier with light of a first wavelength;

detecting light transmitted through the data carrier and/or reflected by the data carrier; and analyzing the detected light to decode the information encoded in the recesses of the first coating, wherein light reflected by the data carrier is detected, wherein light reflected by the data carrier is detected from the second surface.

* * * * *